US010705521B2

(12) United States Patent
Mere et al.

(10) Patent No.: US 10,705,521 B2
(45) Date of Patent: Jul. 7, 2020

(54) AUTONOMOUS DRIVING INTERFACE

(71) Applicant: Visteon Global Technologies, Inc., Van Buren Township, MI (US)

(72) Inventors: Shadi Mere, Ann Arbor, MI (US); Theodore Charles Wingrove, Plymouth, MI (US); Michael Eichbrecht, Farmington Hills, MI (US); Kyle Entsminger, Canton, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 0 days.

(21) Appl. No.: 14/957,215

(22) Filed: Dec. 2, 2015

(65) Prior Publication Data
US 2016/0187879 A1 Jun. 30, 2016

Related U.S. Application Data

(60) Provisional application No. 62/098,147, filed on Dec. 30, 2014.

(51) Int. Cl.
*G05D 1/00* (2006.01)
*B60W 40/09* (2012.01)
*B60W 30/14* (2006.01)
*B60W 30/182* (2020.01)
*B60W 50/08* (2020.01)
*B60W 30/12* (2020.01)
(Continued)

(52) U.S. Cl.
CPC ........... *G05D 1/0061* (2013.01); *B60W 30/12* (2013.01); *B60W 30/143* (2013.01);
(Continued)

(58) Field of Classification Search
CPC ........ G05D 1/0061; G05D 2201/0213; B60W 30/12; B60W 30/143; B60W 30/182;
(Continued)

(56) References Cited

U.S. PATENT DOCUMENTS 8,036,803 B2   10/2011  Michi et al.
8,634,980 B1    1/2014  Urmson et al.
(Continued)

FOREIGN PATENT DOCUMENTS

JP   H0986223 A    3/1997
JP   H10166895 A   6/1998
(Continued)

OTHER PUBLICATIONS

English Translation of Japanese Office Action for related Japanese Application No. 2018-107166 dated Jun. 24, 2019, 3 pages.

*Primary Examiner* — Michael D Lang
(74) *Attorney, Agent, or Firm* — Dickinson Wright PLLC

(57) ABSTRACT

The aspects of the present disclosure provide an autonomous vehicle interface for a vehicle and a method of enabling and employing an autonomous vehicle interface for a vehicle. The autonomous vehicle interface may be configured to seamlessly transition driving modes or the vehicle's mode of operation from user controlled to an autonomous controlled driving without the user physically activating the autonomous controlled driving. The autonomous vehicle interface may also be configured to consider active components and environmental conditions employed by the user in activating the autonomous control. The autonomous vehicle interface may further be configured to consider the user's operational state and/or the user's attentiveness to activate the autonomous vehicle mode. Additionally, the autonomous vehicle interface may be configured to change the vehicle's mode of operation from the autonomous controlled to the user controlled driving in response to a positive change to the user's operational state and/or attentiveness.

15 Claims, 7 Drawing Sheets

(51) Int. Cl.
_B60W 40/08_ (2012.01)
_B60W 50/00_ (2006.01)

(52) U.S. Cl.
CPC .......... _B60W 30/182_ (2013.01); _B60W 40/09_ (2013.01); _B60W 50/082_ (2013.01); _B60W 2040/0818_ (2013.01); _B60W 2040/0827_ (2013.01); _B60W 2050/0095_ (2013.01); _B60W 2540/26_ (2013.01); _B60W 2540/30_ (2013.01); _B60W 2556/50_ (2020.02); _G05D 2201/0213_ (2013.01)

(58) Field of Classification Search
CPC ............... B60W 40/09; B60W 50/082; B60W 2040/0818; B60W 2040/0827; B60W 2050/0095; B60W 2540/26; B60W 2540/30; B60W 2550/402
See application file for complete search history.

(56) References Cited

U.S. PATENT DOCUMENTS

| | | |
|---|---|---|
| 8,818,608 B2 | 8/2014 | Cullianane et al. |
| 2012/0133528 A1 | 5/2012 | Lee et al. |
| 2014/0195120 A1 | 7/2014 | McClain et al. |
| 2015/0014902 A1 | 1/2015 | Ando et al. |
| 2015/0149020 A1* | 5/2015 | Smith ............ B60W 40/09 701/23 |
| 2016/0001781 A1* | 1/2016 | Fung ............ B60W 40/08 701/36 |
| 2016/0137201 A1* | 5/2016 | Okuda ............ B60W 10/18 701/41 |
| 2016/0303972 A1* | 10/2016 | Kuhne ............ B60W 30/12 |

FOREIGN PATENT DOCUMENTS

| | | |
|---|---|---|
| JP | H10315800 A | 12/1998 |
| JP | 2001219760 A | 8/2001 |
| JP | 2006-240412 | 9/2006 |
| JP | 2006318446 A | 11/2006 |
| JP | 2007523787 A | 8/2007 |
| JP | 2008-087635 | 4/2008 |
| JP | 2008186263 A | 8/2008 |
| JP | 2011063105 A | 3/2011 |
| JP | 2011128823 A | 6/2011 |
| JP | 2014511301 A | 5/2014 |
| JP | 2015-098218 | 5/2015 |

* cited by examiner

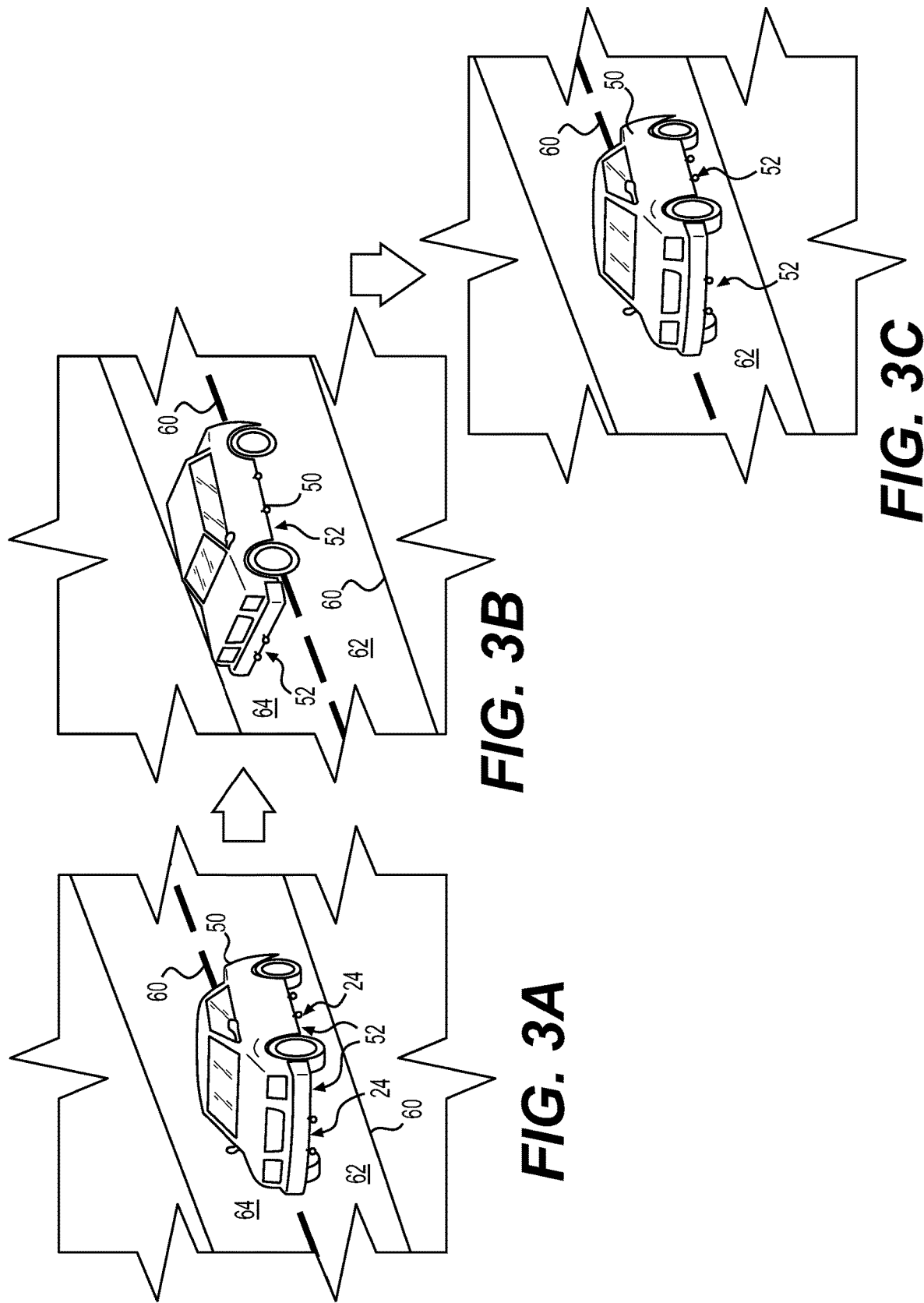

AUTONOMOUS DRIVING INTERFACE

CROSS-REFERENCE TO RELATED APPLICATIONS

This patent application claims priority to U.S. Provisional Application No. 62/098,147, filed Dec. 30, 2014 entitled "AUTONOMOUS DRIVING INTERFACE," now pending. This patent application contains the entire Detailed Description of U.S. Provisional Patent Application No. 62/098,147.

BACKGROUND

Semi-autonomous and autonomous vehicles such as robotic or driver-less vehicles are being developed. The vehicles are designed to sense and navigate around the vehicle's surrounding without the user's input. The vehicles may employ various elements to operate such as, radar tracking, a global position system (GPS), a computer vision system, and the like. Further, the vehicles are capable of mapping and updating the vehicle's driving paths based on conditions or changes the vehicle encounters during operation.

To enter into a semi-autonomous or autonomous state, the vehicle notifies the user to activate or switch to an autonomous mode through an audio or visual alert, and requests that the user activate the autonomous mode. Alternatively, the vehicle may perform a mechanical notification such as, a jarring of the steering wheel or vibration of the seat to alert the user to switch to autonomous mode. Once the user activates the autonomous mode, the user must deactivate the autonomous mode to return to a regular driving mode.

However, various problems exist with the current semi-autonomous and autonomous vehicles. First, the audio, visual, or mechanical alerts occur quickly. This may startle the user, which causes the user to jerk the steering wheel or otherwise create unsafe driving conditions. Second, the semi-autonomous and autonomous modes require the user to activate the mode, which may be inconvenient or impossible at times depending on the user's state. For example, if the user begins to fall asleep at the wheel, they may not be able to activate the autonomous modes. Third, the transition from driving mode to autonomous mode is not seamless. Additionally, the current semi-autonomous and autonomous vehicles do not take into account all conditions experienced by the driver before notifying the driver to switch into an autonomous mode.

SUMMARY

The aspects disclosed herein include a system for providing an autonomous vehicle interface for a vehicle. The system includes an autonomous activation interface configured to switch between an autonomous vehicle mode and a user-controlled vehicle mode; and a component interface configured to interface with a component module of the vehicle, wherein in response to the component interface detecting a stimulus independent a deliberate user based action to switch to the autonomous mode, triggering the autonomous activation interface to switch between the user-controlled vehicle mode to the autonomous vehicle mode.

The component interface may be configured to couple to a mobile device detection device, and in response to the user engaging with the mobile device, instigating the switch to the autonomous mode.

In another example, the component interface may be configured to couple to a global positioning satellite (GPS) device, and in response to the user engaging with the GPS device, instigating the switch to the autonomous mode.

In another example, the component interface is configured to couple to an infotainment device, and in response to the user engaging with the infotainment device, instigating the switch to the autonomous mode.

In another example, the autonomous mode is defined by an engagement of the vehicle's engine independent user-control.

In another example, the autonomous mode is defined by an engagement of the vehicle's steering independent user-control.

Another aspect of the system disclosed herein includes an autonomous activation interface configured to switch between an autonomous vehicle mode and a user-controlled vehicle mode; and a gaze tracking interface configured to interface with a gaze tracking device, and in response to the gaze tracking detecting a specific event, triggering the autonomous activation interface to switch between the user-controlled vehicle mode to the autonomous vehicle mode.

In another example, the specific event is defined by the user averting the user's eyes away from a front of the vehicle In another example, the specific event is defined by the user closing the user's eyes.

In another example, the autonomous mode is defined by an engagement of the vehicle's engine independent user-control.

In another example, the autonomous mode is defined by an engagement of the vehicle's steering independent user-control.

Another aspect of the system disclosed herein includes an autonomous activation interface configured to switch between an autonomous vehicle mode and a user-controlled vehicle mode; and a vehicular sensor interface configured to interface with a sensor associated with the vehicle, and in response to the vehicle sensor interface sensing a predetermined event independent a user activation of the autonomous vehicle mode, triggering the autonomous activation interface to switch the vehicle to the autonomous vehicle mode from the user-controlled vehicle mode.

In another example, the sensor is defined as a weather sensor.

In another example, the sensor is defined as a lane detection sensor.

In another example, the sensor is defined as a road-condition sensor.

BRIEF DESCRIPTION OF THE DRAWINGS

Other advantages of the present disclosure will be readily appreciated, as the same becomes better understood by reference to the following detailed description when considered in connection with the accompanying drawings wherein:

FIGS. 3A, B, and C are illustrations of examples of a vehicle employing an autonomous vehicle interface in response to a user operational state in accordance with the present disclosure;

DETAILED DESCRIPTION

Detailed examples of the present disclosure are provided herein; however, it is to be understood that the disclosed examples are merely exemplary and may be embodied in various and alternative forms. It is not intended that these examples illustrate and describe all possible forms of the disclosure. Rather, the words used in the specification are words of description rather than limitation, and it is understood that various changes may be made without departing from the spirit and scope of the disclosure. As those of ordinary skill in the art will understand, various features of the present disclosure as illustrated and described with reference to any of the Figures may be combined with features illustrated in one or more other Figures to produce examples of the present disclosure that are not explicitly illustrated or described. The combinations of features illustrated provide representative examples for typical applications. However, various combinations and modifications of the features consistent with the teachings of the present disclosure may be desired for particular applications or implementations.

An autonomous vehicle interface that does not startle the user, that transitions seamlessly from a non-autonomous controlled to an autonomous controlled driving without user activation, and takes into account the users state and the surrounding environmental conditions while driving is desired.

The aspects of the present disclosure provide an autonomous vehicle interface for a vehicle, and a method of enabling and employing an autonomous vehicle interface for a vehicle. The autonomous vehicle interface may be configured to seamlessly transition between driving modes or the vehicle's mode of operation from user controlled to autonomous controlled driving without the user physically activating the autonomous controlled. The vehicle may seamlessly transition between driving modes by switching between one or more levels of autonomous controlled driving based on the user's operational state. The autonomous vehicle may be configured to associate the user's operational state and/or environmental conditions surrounding the vehicle to a level of autonomous controlled driving. The autonomous vehicle interface may further be configured to activate the level of autonomous controlled driving based on the user's operational state. The user's operational state may be the user's level of distraction or attentiveness. The autonomous vehicle interface may also be configured to consider active components employed by the user in activating the autonomous controlled driving. Active components may include vehicle components that are ON or operating, for example, a vehicle radio. Additionally, the autonomous vehicle interface may be configured to change the vehicle's mode of operation from autonomous controlled to the user controlled driving in response to a positive change of the user's operational state environmental conditions.

Figure 1:
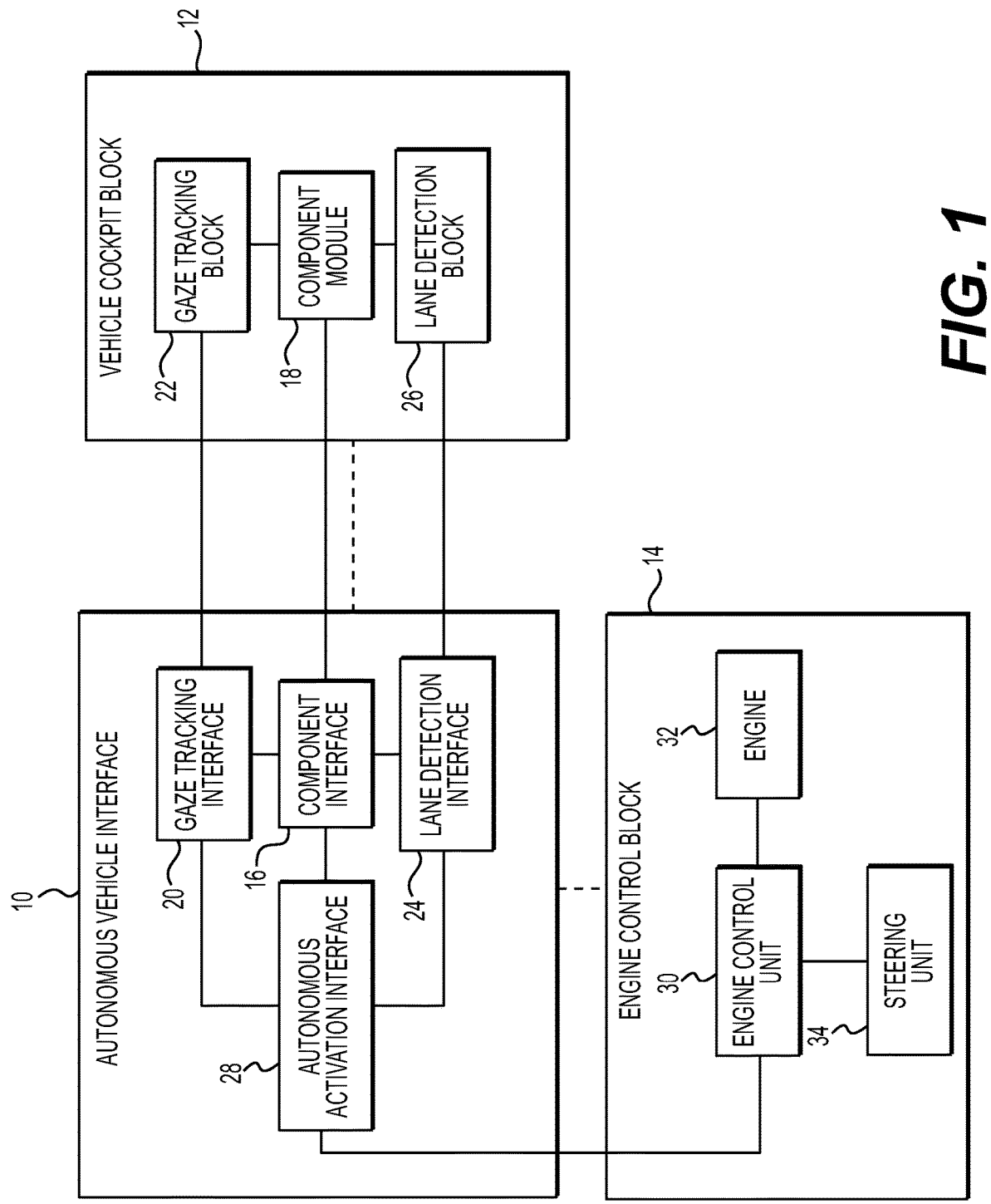
FIG. 1 is a block diagram of an autonomous vehicle interface in accordance with the present disclosure.

FIG. 1 is a block diagram of an autonomous vehicle interface 10 in accordance with the present disclosure. The autonomous vehicle interface 10 may be designed to interface with a vehicle cockpit block 12 to communicate with the components and electronics within the vehicle cockpit. The autonomous vehicle interface 10 may also be designed to interface with the vehicle engine control block 14 to communicate with and control the vehicle engine and steering in response to an activated autonomous controlled driving.

The autonomous vehicle interface 10 may include a component interface 16 configured to be interconnected with one or more components of the component module 18 within the vehicle cockpit block 12. The component interface 16 may be configured to detect or receive data related to active and inactive components within the vehicle cockpit block 12. The components may include an entertainment system, display, global positioning system (GPS), communication module, and the like. Active components may be components that are turned ON or being employed by the user at that time. For example, the active component may be defined as the radio playing; GPS directions displayed, or phone communications with another individual through the vehicle. Inactive components may be components that are not being employed or experienced by the user at that time.

The autonomous vehicle interface 10 may include a gaze tracking interface 20. The gaze tracking interface 20 may interface with a gaze tracking block 22 within the vehicle cockpit block 12. The gaze tracking interface 20 may include, but is not limited to, one or more cameras, sensors, or a combination thereof for detecting the user's eye or head position while driving. The cameras and/or sensors may be located above the steering wheel within the vehicle cockpit. Alternatively, the one or more cameras and/or sensors may be located on the steering wheel or on a portion of the vehicle dashboard behind the steering wheel. The gaze tracking interface 20 may be configured to detect the user's gaze relative to the road and specifically, the user's eye or head position relative to the road. The gaze tracking interface 20 may also detect the user's gaze on components within the vehicle cockpit relative to the road for a period of time. For instance, the cameras and/or sensors may detect if the user takes their eyes off of the road and focuses on a mobile device or another component within the vehicle for a period of time.

The autonomous vehicle interface 10 may also include a lane detection interface 24. The lane detection interface 24 may be in communication with the lane detection block 26 within the vehicle cockpit block 14. The lane detection interface 24 may include one or more cameras, sensors, or a combination thereof. The cameras and/or sensors may be disposed on or underneath the vehicle's front bumper to detect the vehicle's position within a lane of the road. The cameras and/or sensor may also be disposed on or underneath the sides of the vehicle to detection the vehicle position within the lane. The lane detection interface 24 may be configured to detect one or more lane edges and the vehicle position with respect the lane edges. The lane detection interface 24 may detect white or yellow line(s) associated with the lane. Once the lane detection interface 24 does not detect the lane edges on both sides of the vehicle, then the lane detection interface 24 may generate data indicating the vehicle has crossed over a portion of the lane.

The lane detection interface 24 may further be configured to detect an object that within a certain range or proximity to the vehicle and may be configured to alert the user in response to the detected object. The lane detection interface 24 may generate data indicating the object is too close or proximate to the vehicle. For example, the lane detection interface 24 may detect when the vehicle is too close or in danger of colliding with another vehicle when driving. The lane detection interface 24 may also generate feedback to alter the user that the vehicle is too close to another object. The feedback may include visual, audio, a sound, chime, vibration, or a combination thereof.

The autonomous vehicle interface 10 may further include an autonomous activation interface 28. The autonomous activation interface 28 may be in communication with the component interface 16, the gaze tracking interface 20, and the lane detection interface 24. The autonomous activation interface 28 may also be in communication with the vehicle engine control block's 14 engine control unit 30. The engine control unit 30 controls the vehicle's engine 32 and the steering unit 34. The autonomous activation interface 28 may be configured to activate or deactivate a level of autonomous controlled driving based on the user's operational state and surrounding environmental conditions while driving. The level of autonomous controlled driving may be a partial autonomous driving mode or a full autonomous driving mode. For example, a partial mode may include controlling the steering unit or controlling the vehicle's speed. There may be multiple levels of autonomous controlled driving. The user's operational state is determined by the user's level of distraction, which may range from the user taking their eyes off the road to falling asleep or being unconscious. More specifically, the autonomous activation interface 28 may activate the autonomous controlled or change the mode of operation from the user controlled to the autonomous controlled driving in response to the autonomous activation interface 28 determining the user's level of distraction. The autonomous activation interface 28 then may activate the user controlled driving in response to the autonomous activation interface 28 to determining the user is conscious or the surrounding environmental condition are no longer present.

The autonomous activation interface 28 may be configured to receive data transmitted from one or more of the component interface 16, the gaze tracking interface 20, and the lane detection interface 24 to determine whether the user's state of attentiveness, distraction, or the vehicle's surrounding environmental conditions while driving. Data may be transmitted periodically or continuously to the autonomous activation interface 28 to update or change the vehicle's operational state. The autonomous activation interface 28 may be further configured to determine the user's level of distraction based on the data received. The user's level of distraction may be associated with a level of autonomous driving. In operation, the autonomous vehicle interface 10 may consider if the user is experiencing one or more active components, if the user's gaze is focused on the component within the vehicle or a device not associated with the vehicle, and if the vehicle is within the designated lane to determine if the user is in a distracted state or a conscious state. If the user is determined to be distracted, control data representative of activating autonomous driving may be generated and transmitted to the engine control unit 30 for processing, activating, and controlling the steering unit and engine. Once the user is determined to no longer be distracted, control data representative of deactivating autonomous driving or activating user controlled driving may be generated and transmitted to the engine control unit 30.

In another aspect, the autonomous activation interface 28 may be configured to learn and store the user's habits or operational state while operating the vehicle. The autonomous activation interface 28 may also create a user profile based on the user's learned habits or operational state. The autonomous activation interface 28 may be further configured to activate a level of autonomous controlled driving based on the user profile. For example, if the user falls asleep during a specific time period while the user is driving, then the autonomous activation interface 28 can learn, store, and create a user profile indicating that the user falls asleep during the specific time period. The autonomous activation interface 28 may then activate full autonomous controlled driving during that specific time period.

Figure 2:
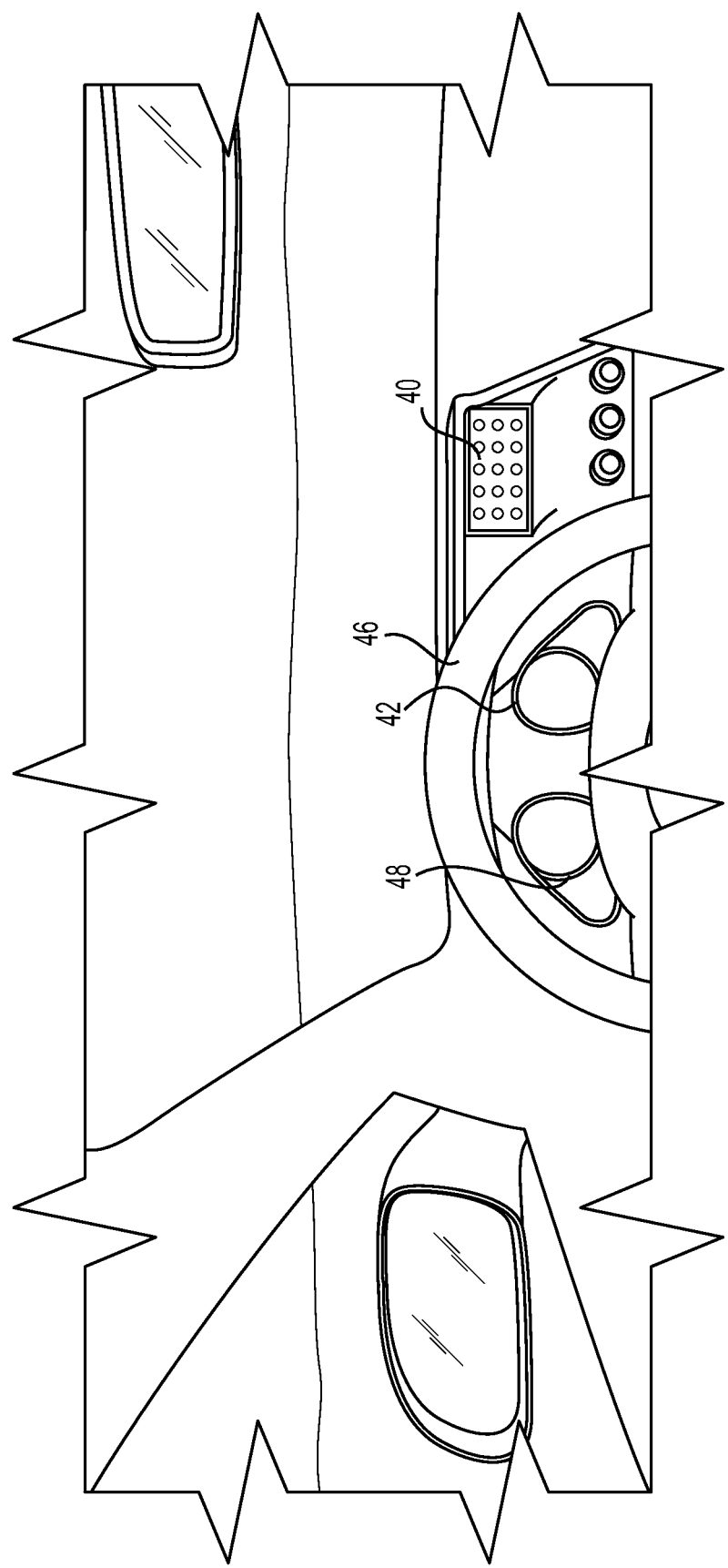
FIG. 2 is an illustration of an example of a vehicle cockpit with an autonomous vehicle interface in accordance with the present disclosure.

FIG. 2 is an illustration of an example of a vehicle cockpit 40 with a gaze tracking interface 20 in accordance with the present disclosure. In particular, FIG. 2 shows a vehicle traveling along a road and the inside of the vehicle's cockpit 40. The vehicle cockpit 40 may have a gaze tracking interface 20 including a tracking device 42 with one or more cameras and/or sensors. The tracking device 42 may be located on a portion 44 of the vehicle cockpit 40 such as, behind the steering wheel 46 or in the dashboard 48. Alternatively, the tracking device 42 may be located above the steering wheel 46 or on the steering wheel 46. The gaze tracking interface 20 may be configured to detect the user's eye or head position relative to the user's gaze towards the road, as discussed in FIG. 1. The gaze tracking interface transmits data to the autonomous activation interface 28 representative of the user's eye or head position relative to the user's gaze towards the road to assist in determining the user's operational state.

FIGS. 3A, B, and C is an illustration of an example of a vehicle 50 employing an autonomous vehicle interface 10 in response to a user operational state in accordance with the present disclosure. FIG. 3A shows the vehicle 50, in a driver or user operated mode, driving along a road 52 prior to a distracted state. The autonomous vehicle interface 10 may include a lane detection interface 24 with one or more cameras and/or sensors 54 located along the vehicle's front bumper 56 or sides 58. As the vehicle 50 travels along the road 52, the cameras and/or sensors 54 detect an edge 60 of the lane 62 on one or both sides of the vehicle 50.

If the user becomes distracted or enters a distracted state, the vehicle 50 may unintentionally cross over the edge 60 of the lane 62 into a second lane 64, as shown in FIG. 3B, and the cameras and/or sensors 54 may no longer detect the edge 60 of the lane 62 along one or both sides of the vehicle 50. Alternatively, the cameras and/or sensors may detect the edge 60 of the lane 62 as the camera and/or sensors pass over the edge 60. As a result, the lane detection interface 24 may trigger the autonomous activation interface 10 to activate the full autonomous controlled driving or to change the mode of operation from the user operating mode to the full autonomous controlled driving, as shown in FIG. 3C. When the vehicle 50 enters into the full autonomous controlled driving, the vehicle 50 automatically returns back into the lane 62 and straightens out to continue along the road 52 without physical activation by the user. After the lane detection interface 24 detects the lane 62 edges 60 on either side of the vehicle and the autonomous activation interface 28 determines the user is not in a distracted state or is in a conscious state, the autonomous activation interface 28 may deactivate autonomous controlled driving and the vehicle 50 may enter the full user controlled driving.

The lane detection interface 24 may also employ the cameras and sensors for object detection to determine when the vehicle 50 is too close or proximate to another vehicle or object on the road.

While FIGS. 3A, B, and C describe one example of transitioning from user controlled to one level of autonomous controlled driving. Other examples of transitioning to and between other levels of autonomous controlled driving exist. One example may include activating a partial or semi-autonomous controlled driving to control the steering unit in response to the autonomous vehicle interface detecting the vehicle is too close to another vehicle or object while driving. Alternatively, a partial autonomous controlled driving may be activated to control the steering unit in response to the user looking away from the road. For example, the user may look down at a mobile device while driving. Another example may include activating a full autonomous controlled driving in response to the user falling asleep at the wheel.

Figure 4A:
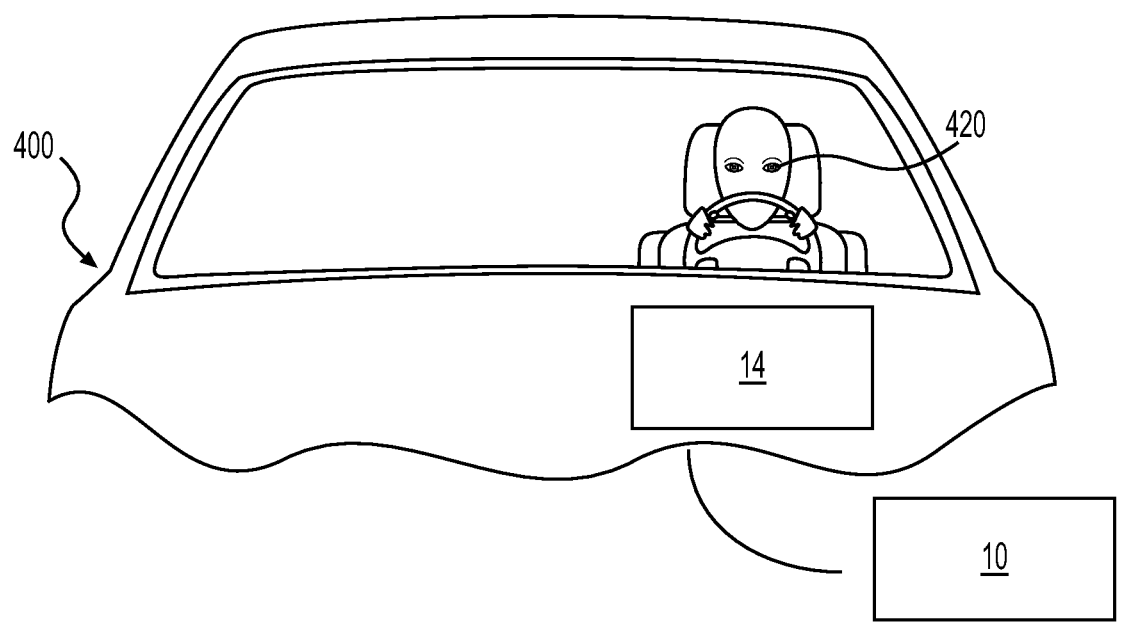
FIGS. 4A and B are illustrations of examples of a vehicle employing another aspect of the autonomous vehicle interface.

FIGS. 4A and B are illustrations of another example of the aspects shown in FIG. 1. The examples shown in FIGS. 3A-C/4A and B are merely exemplary, and thus, various other embodiments employing the core concepts shown in FIG. 1 also be realized according to the aspects disclosed herein.

Figure 4B:
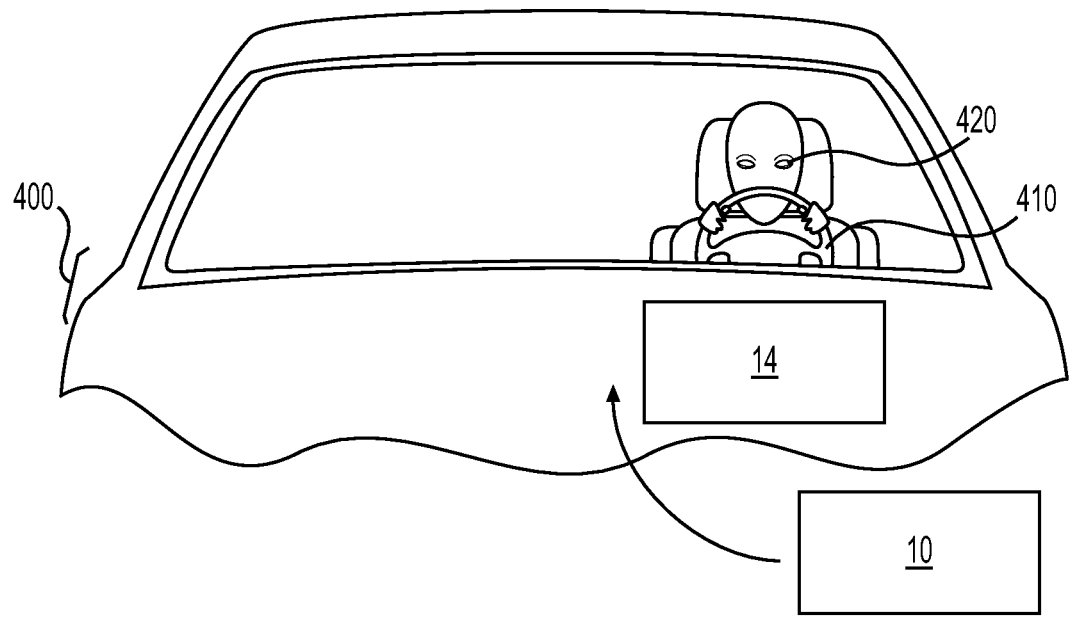

Referring to FIGS. 4A and B, the vehicle 400 includes an autonomous vehicle interface 10 coupled to a vehicle engine control block 14. The components are configured to operate as described above. As shown in the transition between FIG. 4A to 4B, a user's eyes 420 go from a state of being open to closed.

Accordingly, employing the aspects disclosed herein, the autonomous vehicle interface 10 may be configured to detect this transition (or be coupled to a device that detects this transition). Once detected, the autonomous vehicle interface 10 may transition the vehicle 400 into a mode of autonomous control (via the vehicle engine control box 14).

Figure 5:
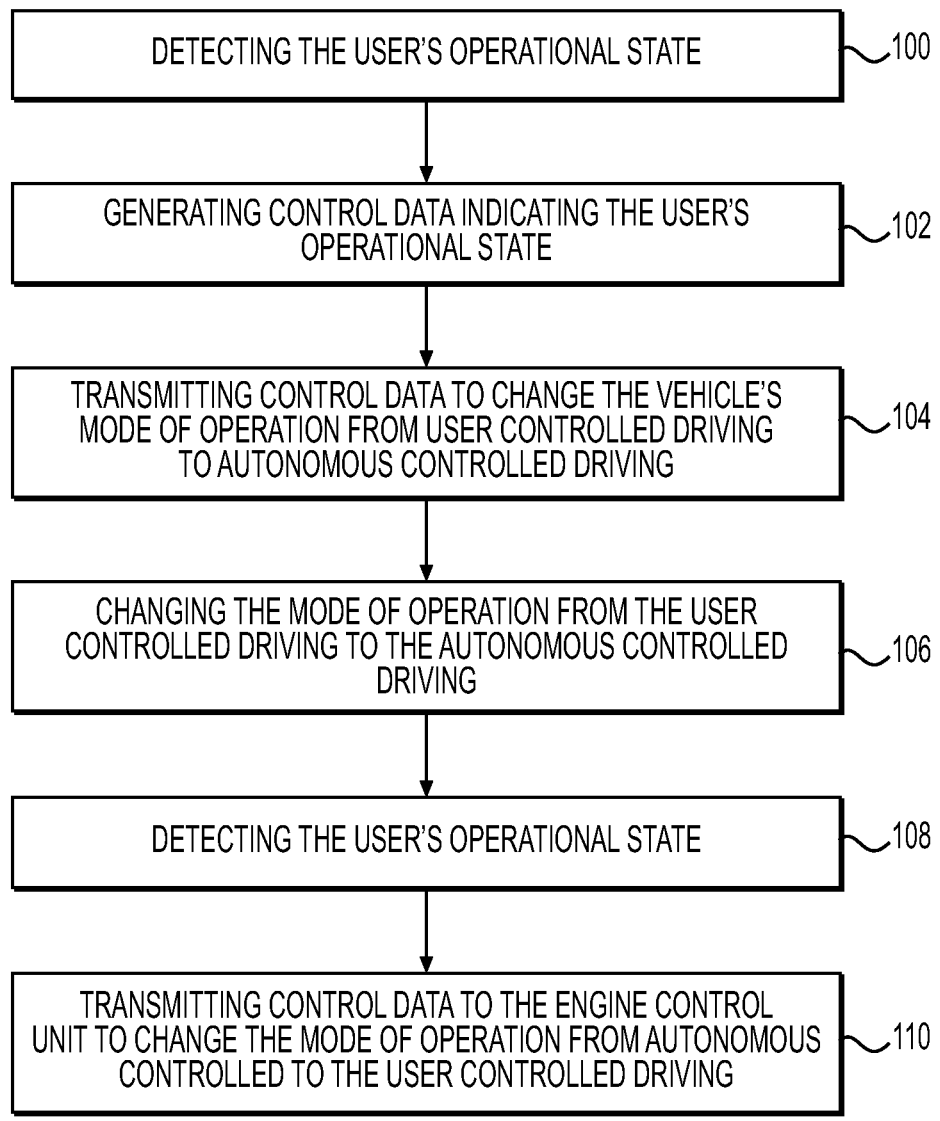
FIG. 5 is a flowchart of a method for enabling and employing an autonomous vehicle interface in accordance with the present disclosure.

FIG. 5 is a flowchart of a method for enabling and employing an autonomous vehicle interface in accordance with the present disclosure. The autonomous vehicle interface may include a component interface, a gaze tracking interface, a lane detection interface, and an autonomous activation interface, as described above in FIGS. 1-4B. The autonomous vehicle interface may be configured to control the vehicle by activating autonomous controlled driving or changing from a user controlled to an autonomous controlled driving in response to the user's operational state. Further, the autonomous vehicle interface may be configured to deactivate the autonomous control or change from the autonomous controlled to the user controlled driving in response to the user's operational state.

The method may include detecting the user's operational state while driving 100. The user's operational state may be the user's level of distraction and surrounding environmental condition, which may be detected by considering one or more conditions experienced by the user. The autonomous activation interface may be configured to associate the number of conditions experiences by the user or the user's level of distraction with the level of autonomous controlled driving to operate the vehicle. The conditions may include the environment surrounding the vehicle while driving, whether one or more components are active within the vehicle, whether the user's gaze is on the road, whether the vehicle is within a lane, drifting out of the lane, or a combination thereof.

In operation, the component interface may be configured to detect or receive data related to active and inactive components within the vehicle. The component interface may generate and transmit the data indicative of active and inactive components to the autonomous activation interface. Additionally, the gaze tracking interface may detect the user's eye or head position relative to the road, and may generate and transmit data indicating the user's eye or head position relative to the road to the autonomous activation interface. The lane detection module may further determine the vehicle's position within the lane by detecting one or more lane edges and the vehicle position with respect the lane edges while driving. The lane detection module may then generate and transmit data indicating the vehicle's position relative to the lane edges to the autonomous activation interface. The autonomous activation interface may receive and process the data, and may determine the user's level of distraction based on one or more conditions experienced by the user.

Once the user's operational state is detected, the autonomous activation interface may generate control data indicating the user's operational state 102. If the user's operational state is a distracted state, then the autonomous activation interface generates control data indicating the user's operational state and the associated level autonomous controlled driving should be activated. For example, if the user's operational state is conscious, then the autonomous activation interface generates control data indicating the user is conscious, is not distracted, and that user controlled driving should remain. The control data may be transmitted from the autonomous activation interface to the engine control unit to activate or to change the vehicle's mode of operation from user controlled to autonomous controlled driving 104. The autonomous vehicle interface and engine control unit may change the mode of operation from the user controlled to the autonomous controlled driving without user's requested input 106.

After autonomous controlled driving has been activated and changed the vehicle's mode of operation, the autonomous vehicle interface may detect the user's operational state while in autonomous controlled driving 108. If the user remains to be distracted, the vehicle will stay operating in the associated level of autonomous controlled driving. If the user is detected as being conscious or not distracted, autonomous activation interface may generate control data indicating the user is conscious. Once the user is determined to be conscious, the autonomous activation interface may transmit the control data to the engine control unit 110 and activate or change the mode of operation from the level of autonomous controlled driving to the user controlled driving 112.

Figure 6:
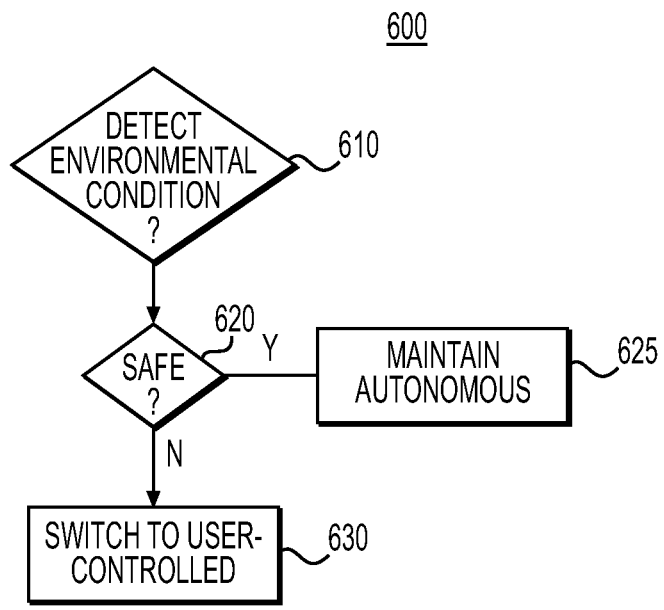
FIG. 6 is a flowchart of a method for enabling and employing an autonomous vehicle interface in accordance with the present disclosure.

FIGS. 6/7 illustrate examples of a method 600 and 700 for providing an autonomous vehicle interface according to one embodiment described above. The methods 600 and 700 are merely explanatory, and do not serve to describe the only permutations of the methods/operations that may be achieved by employing the aspects shown in FIG. 1.

In operation 610, an environmental condition may be detected. For example, the environmental condition may be inclement weather. In another situation, the environmental condition may be a dangerous road (i.e. wet or icy). If the condition is determined to be unsafe, the vehicle is switched to user-controlled (or in another example, to an autonomous mode, depending on how the system is configured)—operation 620 to 630. If the condition is determined to be safe, the vehicle is switched to maintain an autonomous mode (operation 620-625), or vice-versa depending on the implementation.

Method 700 describes another sample implementation of the aspects disclosed herein. In operation 710, a determination is made as to whether the vehicle is in a user-controlled mode. If no, an operation of a wait 715 is performed for a predetermined time (set by an implementer of method 700).

Operation 715 may be replaced by another example implementation of continuously monitoring the state.

In operation 720, a lane sensor is employed, and a determination is made as to whether a lane was crossed (for example, see FIGS. 3A-C). If the lane is crossed, in operation 730, the vehicle is switch to an autonomous mode.

Certain of the devices shown in FIG. 1 may be implemented with a computing system or with the aid of a computing system. The computing system includes a processor (CPU) and a system bus that couples various system components including a system memory such as read only memory (ROM) and random access memory (RAM), to the processor. Other system memory may be available for use as well. The computing system may include more than one processor or a group or cluster of computing system networked together to provide greater processing capability. The system bus may be any of several types of bus structures including a memory bus or memory controller, a peripheral bus, and a local bus using any of a variety of bus architectures. A basic input/output (BIOS) stored in the ROM or the like, may provide basic routines that help to transfer information between elements within the computing system, such as during start-up. The computing system further includes data stores, which maintain a database according to known database management systems. The data stores may be embodied in many forms, such as a hard disk drive, a magnetic disk drive, an optical disk drive, tape drive, or another type of computer readable media which can store data that are accessible by the processor, such as magnetic cassettes, flash memory cards, digital versatile disks, cartridges, random access memories (RAMs) and, read only memory (ROM). The data stores may be connected to the system bus by a drive interface. The data stores provide nonvolatile storage of computer readable instructions, data structures, program modules and other data for the computing system.

To enable human (and in some instances, machine) user interaction, the computing system may include an input device, such as a microphone for speech and audio, a touch sensitive screen for gesture or graphical input, keyboard, mouse, motion input, and so forth. An output device can include one or more of a number of output mechanisms. In some instances, multimodal systems enable a user to provide multiple types of input to communicate with the computing system. A communications interface generally enables the computing device system to communicate with one or more other computing devices using various communication and network protocols.

Figure 7:
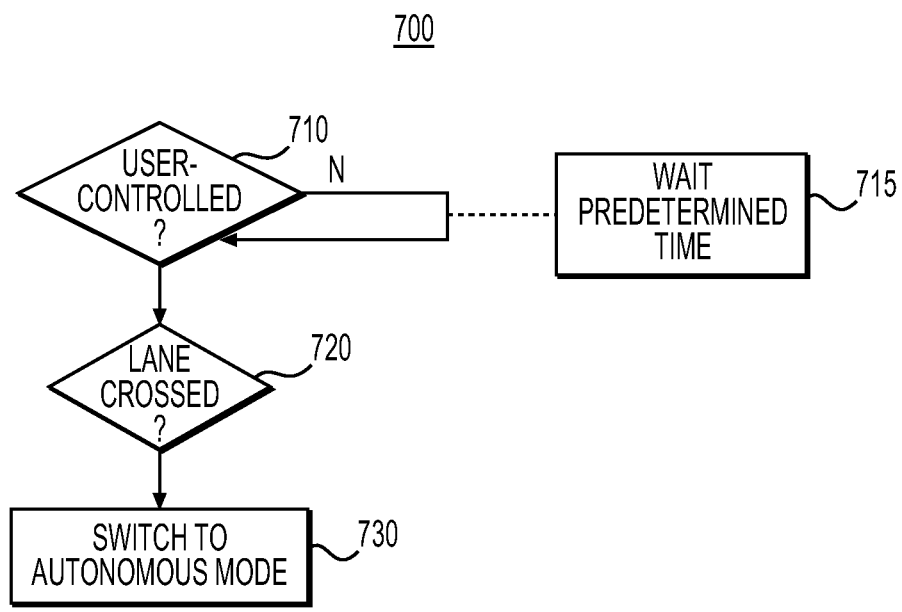
FIG. 7 is a flowchart of a method for enabling and employing an autonomous vehicle interface in accordance with the present disclosure.

The preceding disclosure refers to a number of flow charts and accompanying descriptions to illustrate the embodiments represented in FIGS. 5, 6, and 7. The disclosed devices, components, and systems contemplate using or implementing any suitable technique for performing the steps illustrated in these figures. Thus, FIGS. 5, 6, and 7 are for illustration purposes only and the described or similar steps may be performed at any appropriate time, including concurrently, individually, or in combination. In addition, many of the steps in these flow charts may take place simultaneously and/or in different orders than as shown and described. Moreover, the disclosed systems may use processes and methods with additional, fewer, and/or different steps.

Embodiments disclosed herein can be implemented in digital electronic circuitry, or in computer software, firmware, or hardware, including the herein disclosed structures and their equivalents. Some embodiments can be implemented as one or more computer programs, i.e., one or more modules of computer program instructions, encoded on a tangible computer storage medium for execution by one or more processors. A computer storage medium can be, or can be included in, a computer-readable storage device, a computer-readable storage substrate, or a random or serial access memory. The computer storage medium can also be, or can be included in, one or more separate tangible components or media such as multiple CDs, disks, or other storage devices. The computer storage medium does not include a transitory signal.

As used herein, the term processor encompasses all kinds of apparatus, devices, and machines for processing data, including by way of example a programmable processor, a computer, a system on a chip, or multiple ones, or combinations, of the foregoing. The processor can include special purpose logic circuitry, e.g., an FPGA (field programmable gate array) or an ASIC (application-specific integrated circuit). The processor also can include, in addition to hardware, code that creates an execution environment for the computer program in question, e.g., code that constitutes processor firmware, a protocol stack, a database management system, an operating system, a cross-platform runtime environment, a virtual machine, or a combination of one or more of them.

A computer program (also known as a program, module, engine, software, software application, script, or code) can be written in any form of programming language, including compiled or interpreted languages, declarative or procedural languages, and the program can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

To provide for interaction with an individual, the herein disclosed embodiments can be implemented using an interactive display, such as a graphical user interface (GUI). Such GUI's may include interactive features such as pop-up or pull-down menus or lists, selection tabs, scannable features, and other features that can receive human inputs.

The computing system disclosed herein can include clients and servers. A client and server are generally remote from each other and typically interact through a communications network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

We claim:

1. A system for providing an autonomous vehicle interface for a vehicle, comprising:
   a processor; and
   a memory that includes instructions that, when executed by the processor, cause the processor to:

receive, from a component interface in communication with a component module of the vehicle; component data indicating whether corresponding components of the component module are active;

receive, from a gaze tracking interface, gaze data corresponding to a gaze of a driver of the vehicle relative to a road being traversed by the vehicle;

determine an operational state of the driver based on the component data and the gaze data;

switch, based on a determination that the operational state of the driver indicated that the driver is distracted, to a full autonomous vehicle mode, wherein the determination that the driver is distracted includes a determination, based on the component data, that the driver is experiencing at least one component of the component module and a determination, based on the gaze data, that the driver is not looking in the direction of the road;

switch, based on a determination that the operational state of the driver indicates that the driver is not looking in the direction of the road, to a partial autonomous vehicle mode, wherein the determination that the operational state of the driver indicates that the driver is not looking in the direction of the road includes a determination, based on the component data, that the driver is not experiencing any components of the component module and a determination, based on the gaze data, that the driver is not looking in the direction of the road;

determine, based on the component data, whether the driver is engaging with a mobile device;

switch, in response to a determination that the driver is engaging with the mobile device, to the full autonomous vehicle mode or the partial autonomous vehicle mode, wherein the component module interfaces with the mobile device and wherein the component data indicates that the mobile device is an active component;

receive, from a camera or a sensor, lane data corresponding to the road;

identify, using the lane data, lane edges of one or more lanes of the road;

determine a distance between the vehicle and the identified lane edges;

switch, in response to a determination that the operation state of the driver indicates that the driver is not distracted and a determination that the distance is greater than or equal to the threshold, to the partial autonomous vehicle mode or a driver controlled vehicle mode.

2. The system according to claim 1, wherein the instructions further cause the processor to:

couple to a global positioning satellite (GPS) device; and in response to the driver engaging with the GPS device, switch to the full autonomous vehicle mode or the partial autonomous vehicle mode.

3. The system according to claim 1, wherein the instructions further cause the processor to:

couple to an infotainment device; and in response to the driver engaging with the infotainment device, switch to the full autonomous vehicle mode or the partial autonomous vehicle mode.

4. The system according to claim 1, wherein the partial autonomous vehicle mode is defined by an engagement of the vehicle's engine independent of user-control.

5. The system according to claim 1, wherein the full autonomous vehicle mode is defined by an engagement of the vehicle's steering independent of user-control.

6. A method for providing an autonomous vehicle interface for a vehicle, the method comprising:

receiving, from a component interface in communication with a component module of the vehicle; component data indicating whether corresponding components of the component module are active;

receiving, from a gaze tracking interface, gaze data corresponding to a gaze of a driver of the vehicle relative to a road being traversed by the vehicle;

determining an operational state of the driver based on the component data and the gaze data;

switching, based on a determination that the operational state of the driver indicates that the driver is distracted, to a full autonomous vehicle mode, wherein the determination that the driver is distracted includes a determination, based on the component data, that the driver is experiencing at least one component of the component module and a determination, based on the gaze data, that the driver is not looking in the direction of the road;

switching, based on a determination that the operational state of the driver indicates that the driver is not looking in the direction of the road, to a partial autonomous vehicle mode, wherein the determination that the operational state of the driver indicates that the driver is not looking in the direction of the road includes a determination, based on the component data, that the driver is not experiencing any components of the component module and a determination, based on the gaze data, that the driver is not looking in the direction of the road;

determining, based on the component data, whether the driver is engaging with a mobile device;

switching, in response to a determination that the driver is engaging with the mobile device, to the full autonomous vehicle mode or the partial autonomous vehicle mode, wherein the component module interfaces with the mobile device and wherein the component data indicates that the mobile device is an active component;

receiving, from a camera or a sensor, lane data corresponding to the road;

identifying, using the lane data, lane edges of one or more lanes of the road;

determining a distance between the vehicle and the identified lane edges;

switching, in response to a determination that the distance is less than a threshold, to the full autonomous vehicle mode or the partial autonomous vehicle mode; and switching, in response to a determination that the operation state of the driver indicates that the driver is not distracted and a determination that the distance is greater than or equal to the threshold, to the partial autonomous vehicle mode or a driver controlled vehicle mode.

7. The method according to claim 6, further comprising:

coupling to a global positioning satellite (GPS) device; and in response to the driver engaging with the GPS device, switching to the full autonomous vehicle mode or the partial autonomous vehicle mode.

8. The method according to claim 6, further comprising:
coupling to an infotainment device; and
in response to the driver engaging with the infotainment device, switching to the full autonomous vehicle mode or the partial autonomous vehicle mode.

9. The method according to claim 6, wherein the partial autonomous vehicle mode is defined by an engagement of the vehicle's engine independent of user-control.

10. The method according to claim 6, wherein the full autonomous vehicle mode is defined by an engagement of the vehicle's steering independent of user-control.

11. A vehicle control system comprising:
a processor; and
a memory including instructions that, when executed by the processor, cause the processor to:
receive component data corresponding to activity of components of the vehicle;
receive gaze data corresponding to a gaze of a driver of the vehicle relative to a road being traversed by the vehicle;
determine whether the driver is experiencing at least one component of the vehicle based on the component data;
determine whether the driver is looking in a direction of the road based on the gaze data;
switch, based on a determination that the driver is experiencing at least one component of the vehicle and a determination that the driver is not looking in the direction of the road, to a full autonomous vehicle mode;
switch, based on a determination that the driver is not experiencing any components of the vehicle and a determination that the driver is not looking in the direction of the road, to a partial autonomous vehicle mode;
receive lane data corresponding to the road;
identify, using the lane data, lane edges of one or more lanes of the road;
switch, in response to a determination that a distance between the vehicle and the identified lane edges is less than a threshold, to the full autonomous vehicle mode or the partial autonomous vehicle mode; and
switch, in response to a determination that the operation state of the driver indicates that the driver is not distracted and a determination that the distance between the vehicle and the identified lane edges is greater than or equal to the threshold, to the partial autonomous vehicle mode or a driver controlled vehicle mode.

12. The system according to claim 11, wherein the instructions further cause the processor to:
determine, based on the component data, whether the driver is engaging with a global positioning satellite (GPS) device; and
in response to a determination that the driver is engaging with the GPS device, switch to the full autonomous vehicle mode or the partial autonomous vehicle mode.

13. The system according to claim 11, wherein the instructions further cause the processor to:
determine, based on the component data, whether the driver is engaging with an infotainment device; and
in response to a determination that the driver is engaging with the infotainment device, switch to the full autonomous vehicle mode or the partial autonomous vehicle mode.

14. The system according to claim 11, wherein the partial autonomous vehicle mode is defined by an engagement of the vehicle's engine independent of user-control.

15. The system according to claim 11, wherein the full autonomous vehicle mode is defined by an engagement of the vehicle's steering independent of user-control.

* * * * *